US009467811B2

(12) United States Patent
Nilsson

(10) Patent No.: US 9,467,811 B2
(45) Date of Patent: Oct. 11, 2016

(54) POLICY DETERMINED ACCURACY OF TRANSMITTED INFORMATION

(71) Applicant: Nokia Corporation, Espoo (FI)

(72) Inventor: Jarl A. Nilsson, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 25 days.

(21) Appl. No.: 14/031,544

(22) Filed: Sep. 19, 2013

(65) Prior Publication Data

US 2014/0045524 A1 Feb. 13, 2014

Related U.S. Application Data

(63) Continuation of application No. 12/773,501, filed on May 4, 2010, now Pat. No. 8,544,103.

(51) Int. Cl.
  *G06F 21/62* (2013.01)
  *H04W 4/02* (2009.01)
  *H04W 4/18* (2009.01)
  *H04W 12/08* (2009.01)

(52) U.S. Cl.
  CPC .......... *H04W 4/025* (2013.01); *G06F 21/6245* (2013.01); *H04W 4/185* (2013.01); *H04W 12/08* (2013.01); *G06F 2221/2111* (2013.01)

(58) Field of Classification Search
  CPC ................................................ G06F 21/6245
  USPC ........................................................ 726/26
  See application file for complete search history.

(56) References Cited

U.S. PATENT DOCUMENTS

| 4,845,658 | A | 7/1989 | Gifford |
| 5,504,873 | A | 4/1996 | Martin et al. |
| 5,715,403 | A | 2/1998 | Stefik |
| 5,787,334 | A | 7/1998 | Fardeau et al. |
| 5,892,900 | A | 4/1999 | Ginter et al. |
| 5,920,861 | A | 7/1999 | Hall et al. |
| 5,943,422 | A | 8/1999 | Van Wie et al. |
| 6,112,181 | A | 8/2000 | Shear et al. |

(Continued)

FOREIGN PATENT DOCUMENTS

| JP | 5303668 | 11/1993 |
| JP | 7113963 | 12/1995 |
| KR | 2005066508 | 6/2005 |

OTHER PUBLICATIONS

International Search Report and Written Opinion mailed Jan. 2, 2012, issued in International Application No. PCT/US2011/034579.

(Continued)

*Primary Examiner* — Dede Zecher
*Assistant Examiner* — Jason C Chiang
(74) *Attorney, Agent, or Firm* — Mintz Levin Cohn Ferris Glovsky and Popeo, P.C.

(57) ABSTRACT

Systems and methods for controlling accuracy of transmitted information are described. A package is assembled based on a numerical value, such as a measurement, and one or more policies associated with the sender. When the package is received by a receiver, it is unpacked to yield a second value representing the numerical value and having a reduced accuracy with respect to the first value. The accuracy reduction depends on policies associated with the receiver and/or the sender. Examples of numerical values in different applications include geo-location data, medical data, and financial data.

23 Claims, 7 Drawing Sheets

(56) References Cited

U.S. PATENT DOCUMENTS

| | | | |
|---|---|---|---|
| 6,157,721 | A | 12/2000 | Shear et al. |
| 6,185,683 | B1 | 2/2001 | Ginter et al. |
| 6,314,409 | B2 | 11/2001 | Schneck et al. |
| 6,578,081 | B1 | 6/2003 | Tominaga et al. |
| 6,640,184 | B1* | 10/2003 | Rabe .................. 701/517 |
| 6,658,568 | B1 | 12/2003 | Ginter et al. |
| 6,938,024 | B1 | 8/2005 | Horvitz |
| 7,076,652 | B2 | 7/2006 | Ginter et al. |
| 7,080,402 | B2* | 7/2006 | Bates et al. ............. 726/2 |
| 7,140,035 | B1 | 11/2006 | Karch |
| 7,490,763 | B2 | 2/2009 | Keohane et al. |
| 7,523,316 | B2 | 4/2009 | Cheng et al. |
| 7,591,020 | B2 | 9/2009 | Kammer et al. |
| 7,694,148 | B2 | 4/2010 | Cheng et al. |
| 7,712,660 | B2 | 5/2010 | Keohane et al. |
| 7,774,851 | B2 | 8/2010 | Singh et al. |
| 8,051,490 | B2 | 11/2011 | Nomura et al. |
| 2001/0055975 | A1* | 12/2001 | McDonnell et al. ......... 455/456 |
| 2003/0031178 | A1 | 2/2003 | Haeri et al. |
| 2003/0115481 | A1 | 6/2003 | Baird et al. |
| 2004/0123150 | A1 | 6/2004 | Wright et al. |
| 2005/0047353 | A1 | 3/2005 | Hares |
| 2005/0136895 | A1* | 6/2005 | Thenthiruperai et al. . 455/412.2 |
| 2006/0059096 | A1 | 3/2006 | Dublish et al. |
| 2006/0059100 | A1 | 3/2006 | Ronning et al. |
| 2006/0069749 | A1* | 3/2006 | Herz et al. ............ 709/219 |
| 2006/0277122 | A1 | 12/2006 | Shear et al. |
| 2007/0153715 | A1* | 7/2007 | Covington et al. .......... 370/315 |
| 2007/0180519 | A1 | 8/2007 | Boccon-Gibod et al. |
| 2008/0207165 | A1 | 8/2008 | Eckhart |
| 2008/0227467 | A1* | 9/2008 | Barnes ............. G06Q 30/0259 455/456.2 |
| 2009/0029718 | A1* | 1/2009 | Nilsson ............. 455/456.1 |
| 2009/0031431 | A1 | 1/2009 | Boccon-Gibod |
| 2009/0172408 | A1 | 7/2009 | Cheng et al. |
| 2009/0217344 | A1 | 8/2009 | Bellwood et al. |
| 2009/0265242 | A1* | 10/2009 | Horvitz et al. ............ 705/14.52 |
| 2009/0319616 | A1* | 12/2009 | Lewis et al. ............ 709/206 |
| 2009/0323972 | A1* | 12/2009 | Kohno ............. G06F 21/6245 380/284 |
| 2010/0071070 | A1 | 3/2010 | Jawa et al. |
| 2010/0077484 | A1* | 3/2010 | Paretti et al. ............ 726/26 |
| 2010/0144334 | A1 | 6/2010 | Gorokhov et al. |
| 2012/0078875 | A1 | 3/2012 | Price |

OTHER PUBLICATIONS

Canetti et al., "Deniable Encryption", Jun. 2, 1997 (14 pages).
Final Office Action mailed Jun. 6, 2008, issued in U.S. Appl. No. 11/431,344, 10 pages.
Amendment filed Jul. 8, 2009, in U.S. Appl. No. 11/431,344, 28 pages.
Office Action mailed Nov. 24, 2009, issued in U.S. Appl. No. 11/429,385, 17 pages.
Response to Office Action filed May 24, 2010, in U.S. Appl. No. 11/429,385, 27 pages.
Office Action mailed Feb. 25, 2008, issued in U.S. Appl. No. 11/435,425, 8 pages.
Response to Office Action filed Apr. 30, 2008, in U.S. Appl. No. 11/435,425, 6 pages.
Office Action mailed Jul. 29, 2008, issued in U.S. Appl. No. 11/435,425, 7 pages.
Response to Office Action filed Dec. 1, 2008, in U.S. Appl. No. 11/435,425, 6 pages.
Final Office Action mailed Feb. 18, 2009, issued in U.S. Appl. No. 11/435,425, 7 pages.
Notice of Appeal and Pre-Appeal Brief Request for Review filed Aug. 18, 2009, in U.S. Appl. No. 11/435,425, 8 pages.
Notice of Panel Decision from Pre-Appeal Brief Review mailed Dec. 18, 2009, issued in U.S. Appl. No. 11/435,425, 2 pages.
Appeal Brief filed Jan. 19, 2010, in U.S. Appl. No. 11/435,425, 28 pages.
Examiner's Answer to Appeal Brief mailed Apr. 14, 2010, issued in U.S. Appl. No. 11/435,425, 8 pages.
Reply Brief filed Jun. 14, 2010, in U.S. Appl. No. 11/435,425, 6 pages.
Decision on Appeal mailed Apr. 15, 2013, issued in U.S. Appl. No. 11/435,425, 7 pages.
Callaway, E.; "Global Genomic Data-Sharing Effort Kicks Off"; Nature News; Mar. 6, 2014; pp. 1-2.
Gymrek, M. et al.: "Identifying Personal Genomes by Surname Inference"; Science, vol. 339, No. 6117; Jan. 18, 2013; pp. 321-324.
Homer, N. et al.; "Resolving individuals contributing trace amounts of DNA to highly complex mixtures using high-density SNP genotyping microarrays"; PLoS Genetics; vol. 4,. No. 8; Aug. 2008; pp. 1-9.
Kolata, G.; "Poking Holes in Genetic Privacy"; New York Times, Jun. 16, 2013; pp. 1-3.
Lemke, A.A. et al.; "Public and Biobank Participant Attitudes toward Genetic Research Participation and Data Sharing"; Public Health Genomics; vol. 13; Jan. 15, 2010; pp. 368-377.
Lunshof, J. et al.; "From Genetic Privacy to Open Consent"; Nature Reviews | Genetics; vol. 9; May 2008; pp. 406-411.
Nyholt, D. et al.; "On Jim Watson's *APOE* status: genetic information is hard to hide"; European Journal of Human Genetics; vol. 17, No. 2; Feb. 2009; pp. 147-149.
Sankararaman, S. et al.; "Genomic privacy and limits of individual detection in a pool"; Nature Genetics; vol. 41, No. 9; Sep. 2009; pp. 965-967.

* cited by examiner

POLICY DETERMINED ACCURACY OF TRANSMITTED INFORMATION

CROSS-REFERENCE To RELATED APPLICATIONS

This application is a continuation of U.S. patent application Ser. No. 12/773,501 filed May 4, 2010, the disclosure of which is incorporated herein by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

The last few years have seen a marked increase of information published or otherwise sent via electronic media. The need for privacy and protection of certain types of information has also increased significantly. Moreover the sender of the information may want to limit the accuracy of information depending upon who the recipient is.

For example, as more devices become geo location aware these devices will increasingly send the location data to consumers and consolidators of this data. The users of these devices will increasingly want to protect their location information, and control the quality and resolution of this information. A user of a geo location transmitting device may want to give the highest accuracy geo location data to their friends, while giving certain advertisers (e.g., restaurants) geo location data with an accuracy of about 10 miles, and other advertisers (e.g., concert promoters) geo location data with an accuracy of about 100 miles. In another example, a user may want to share or sell his location to a consolidator or data miner, but only want to reveal the location down to an accuracy of 5 miles, while at the same time providing friends and family with an accuracy down to the block level and co-workers with an accuracy down to 10 miles.

In another example, users may want to share or sell some of their vital data, but do not want the opposite party to gain full knowledge of the data. Such a situation would occur when two parties want to exchange age information, but only reveal the age down to an accuracy of a decade.

Another example is when a user wants to reveal blood sugar levels with the highest possible accuracy to the user's current general practitioner, while at the same time only letting the insurance company know the blood sugar levels to an accuracy of two digits of precision.

Systems and methods for controlling accuracy of information sent by a sender are described herein. According to some embodiments, a method is described which includes receiving a first value representing a numerical value; assembling a package based in part on the first value; and sending the package. The package, when received by a receiver, is unpacked to yield a second value representing the numerical value and having a reduced accuracy with respect to the first value. The accuracy reduction depending on one or more policies and an identity associated with the receiver or the sender.

According to some embodiments, the numerical value is based on a numerical measurement or a set of numerical measurements. The policies can include one or more policies associated with the sender and/or the receiver. The package assembly can be based in part on the policies associated with the sender.

According to some embodiments the method is applied to a set of values, for instance a series of measurements describing the variation of a physical parameter. According to some embodiments, the set of values has different policies attached to different parts of the set. For example, if a set represents the geo location measurements for the last 24 hours, the locations around the home may be associated with different policies than the locations around the workplace.

According to some embodiments, the package is sent to a first receiver and a second receiver, the first receiver unpacking the package to yield one value having a reduced accuracy, and the second receiver unpacking the package to yield a different value also having a reduced accuracy. The policies can be applied to reduce accuracy prior to reception by the receiver, and the numerical value can be entered manually by the sender.

According to some embodiments, the package can be sent to a first receiver, who unpacks the value to extract a reduced value. The first receiver can then transmit the original package to a second receiver who unpacks the package to extract a different value possibly with higher accuracy than the first receiver. According to some embodiments, the packages are transitive. For example, the packages can be bought and sold by receivers to third parties, who may extract values depending on the policy and credentials they present.

According to some embodiments, the numerical value relates to a geographic location, and can represent one or more types of location information, such as: country, region, city, postal/zip code, latitude, longitude, Universal Transverse Mercator coordinate, and timezone.

According to some other embodiments, the numerical value relates to medical data, an can represent information such as: body temperature, blood pressure, pulse rate, respiratory rate, and blood chemistry.

According to some other embodiments the numerical value relates to financial data. For example, the numerical value can represent financial estimate of risk and/or financial estimate of worth.

It will be appreciated that these systems and methods are novel, as are applications thereof and many of the components, systems, and methods employed therein. It should be appreciated that embodiments of the presently described inventive body of work can be implemented in numerous ways, including as processes, apparatuses, systems, devices, methods, computer readable media, and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Systems and methods are described for controlling accuracy using policies. Preferred embodiments enable a sender to package information, for example a numerical measurement, using an identity or set of identities of the sender, and one or more sender policies regarding the accuracy of the information. The package is transmitted to one or more receivers who unpack the packaged information according to the receiver's identity or set of identities and one or more sender and/or receiver policies.

Figure 1:
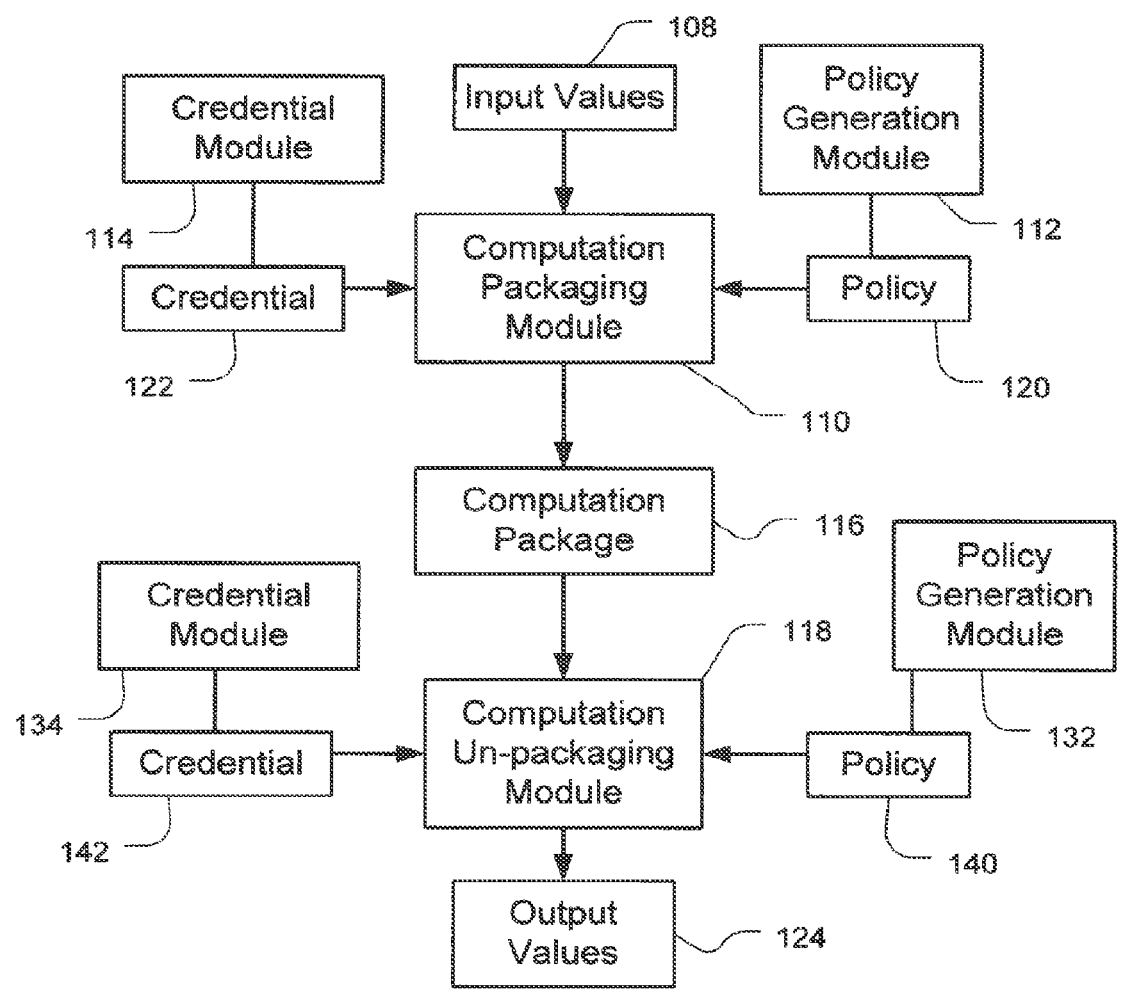
FIG. 1 is a block diagram showing some modules used in a system or method for controlling accuracy using policies, according to some embodiments.

FIG. 1 is a block diagram showing some modules used in a system or method for controlling accuracy using policies, according to some embodiments. This system includes a computation packaging module 110 which as input takes a set of input values 108 or a computation that produces values. The output of this module is a computation package 116. A policy generation module 112 lets the sender specify the accuracy behavior of the calculation, for example, via policy 120. A credential module 114 identifies sender via credential 122. According to some embodiments, the credential module 114 is a public key cryptographic unit, or a bio metric module that identifies the sender to the system. According to some embodiments, policy generation module 112 may include a simple question and answer session or a form that enables the sender to establish how his or her data will be controlled. The policy generation module may also include a packager that packages the policy specified by the sender into one or more license or control objects, e.g., such as those described in commonly assigned, co-pending U.S. patent application Ser. No. 11/583,693 (Publication No. 2007/0180519), filed Oct. 18, 2006 ("the '693 application"), which is hereby incorporated by reference in its entirety herein.

A computation un-packaging module 118 takes as input the computation package 116 and, optionally, a policy 140 from a policy generation module 132, for example, as determined by another stakeholder of the data. Un-packaging module 118 may also optionally take as input a credential 142 as determined by credential module 134. According to some embodiments, the policy generation module 132 for the receiver is a program included in the device from the manufacturer establishing how accurate this device is allowed to be. According to some embodiments, the manufacturer sets policies to improve accuracy depending on the amount of money paid by the receiver.

The computation package 116 (which can include some or all aspects of policy 120 and credential 122), and the policy 140, and the credential 142 are processed in the un-packaging module 118 to produce output values 124 whose deviation from the input values 108 presented to the computation packaging module 110 is within the limits specified by the policies 120 and/or 140.

Figure 2:
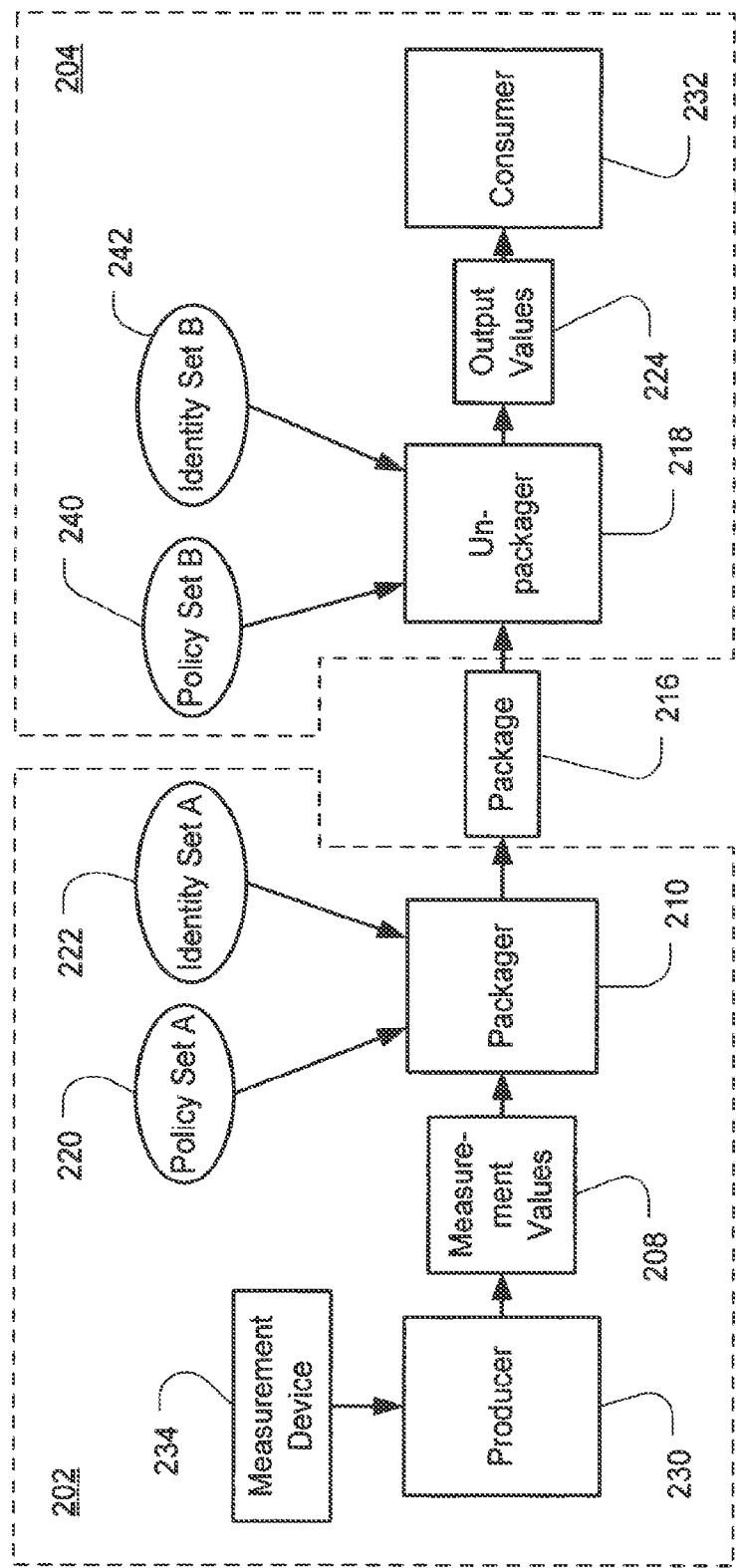
FIG. 2 is a block diagram showing further detail of a system or method for controlling accuracy using policies, according to some embodiments.

FIG. 2 is a block diagram showing further detail of a system or method for controlling accuracy using policies, according to some embodiments. The sending system 202 includes a producer 230 that takes one or more values, such as numerical measurements from measurement device 234, optionally processes the measurements (e.g., performs calculations using the measurements), and passes one or more values 208 to packager 210. The packager 210 combines the values 208 with policy set A 220 and identity set A 222, thereby generating one or more packages, such as package 216.

Examples of measurement device 234 include, without limitation, geo location devices such as GPS measurement devices, medical measurement devices such as a thermometer, blood pressure monitor, or a blood chemistry measurement device such as a blood glucose measurement device, or virtually any other type of measurement device. The identity set A 222 corresponds to one or more identities of the sender. The identity set A 222, of the sender will determine which, what and/or how policies of policy set A are in force for a particular application.

The policy set A 220 can be determined by the sender, a third-party, or a combination of the sender and one or more third-parties. For example, the sender could be a licensee who only has a license to send data of a certain accuracy from the measurement device 234. Another example is where the user-sender only wants medical information with full accuracy to go to the sender's doctor, and wants lower resolution information to be sent to others, such as an insurance company. In the case of location information being sent, one example is where the user-sender only wants the exact location to be known by his or her immediate family members. Yet another example is where a police officer's exact location should only be known to other officers and less accurate location information, such as city block level resolution, is sent to members of the general public.

The package 216 is transmitted from the sending system 202 to a receiving system 204. Receiving end 204 receives package 216 and unpackager 218 unpackages package 216 according to the policy set B 240 (e.g., if specified) and identity set B 242 (e.g., if specified or required, for example, by either of policy set A or policy set B), to generate the output value or values 224 which is then made available to the consumer 232. Identity set B 242 includes one or more identities corresponding to or relating to the consumer. Note that policy set B 240 can be different from policy set A 220, and for example can be set by the consumer, or one or more third parties such as the consumer's device manufacture, or set by a combination of the consumer and one or more third parties. Since information from the policy set A 220 and identity set A 222, is used and in some cases incorporated into the package 216 by packager 210, at the time of unpacking by unpackager 218, in general, a combination of both policy sets and both identity sets can be used in determining the accuracy of the output values.

According to some embodiments, one or more of the policies of policy sets A and B, are collected by either the packager 210 and/or the unpackager 218 from a policy server, or some other source or sources depending on the identity information in identity sets A and/or B.

Note that although policy sets A and B are described, in some cases there will only be one policy set or the other. Likewise, although two identity sets A and B are described, in some cases there will only be one identity set or the other. For example, in some cases policies are only specified by the sender, but not the receiver, and in some cases policies are only applied at the sender end but not by the receiver. An example of the latter situation is where the sender is not be allowed to send values with high accuracy from this device until he pays for the privilege to do so. According to another example, the sender may not be allowed to see or send high accuracy data, but policy enables police to monitor the data with the highest possible accuracy.

In some embodiments, the sender's identity helps the receiving device choose policies and establish to the receiver who sent the data.

In some embodiments, the sender does not need to know the identity of the receiver. According to one example, when the receiver is unknown, the values are unpackaged to a low accuracy value. In some cases, where a particular receiver or group of receivers are intended to get high accuracy values, such receiver or receivers have to identify themselves as belonging to that group via the credentials they present to the receiving device.

In some embodiments, the receiver's identity is also used to select the policies that apply to the receiver.

According to some embodiments, it is possible that the receiver gets a higher accuracy value than the sender has access to, depending on the policies applied.

According to some embodiments, identity can be established via signed certificates, such as PKI. A receiver can for instance present a certificate to the receiving device claiming to be a loan officer of a certain bank signed by a certain individual. This certificate is then used to establish a high accuracy income figure for a loan applicant.

According to some embodiments the signature of the sender is stripped away by an aggregator. The package is then signed by the aggregator who thereafter maintains a mapping between the originator of the package and the new package. The identity mapping of the originator can then be sold as a part of a negotiation. An example of this is an aggregator presenting a customer with a set of medium accuracy blood sugar level readings as part of an initial negotiation, while then providing the original signature to the customer so that the customer can make individual deals with originators of potentially interesting data to sell high accuracy values directly to the customer of the aggregator.

In this example, there are three groups of actors: Original owners of the data, one or more aggregators, and some buyers of data. The original owners produce data and deliver the data to an aggregator. In this example, it can be biometric data. In this example, the owners do not wish to give away all information to the aggregator, so they apply a policy to the data that allows the aggregator to see enough of the data to make the data interesting to a potential buyer, but not enough to reveal all the accuracy of the data. The aggregator can then either unpack the data (to the specified accuracy for the aggregator) and bundle it himself for potential sale to an interested buyer (for example, a medical company who is looking for blood sugar level data). Or the aggregator can send the data to the buyer (who is affected by some policy, for example, a generic "public accuracy" policy) without the identity of the original owner.

An objective of the aggregator in this example is to profit by data mining for potentially interested customers. An objective of the seller/producer of data is to retain enough negotiation leverage to be able to sell more accurate data later at a higher price. Neither the seller nor the aggregator wants to show data with full accuracy to the buyer, since the buyer then can walk away with the shared data.

According to some other embodiments aggregators can facilitate communication with advertisers. Aggregators can for example sell lists of codified behavior patterns to merchants (such as offering, for $x, to provide a list of people who eat some form of grain for breakfast, and the location of their homes with an accuracy down to about a city block level). The actual producer of data (e.g. a consumer at home eating breakfast cereal) may want to retain information of what actual brand he prefers for sale to the producer of that brand.

In other words, these embodiments enable consumers to directly negotiate with advertisers about how much the information they produce is worth, while at the same time allowing data mining companies to act on their behalf to find potential customers for them.

Thus, according to some embodiments, aggregators can either unpackage the data and apply their policy to the data (while keeping a database with information where the data came from), or repackage data to hide the original data producer, stamp themselves as originator, and apply their policy to the data. The data buyer combines the policies from all originators and intermediaries to unpack the data. Thus, by providing transitivity of policy determined accuracy, senders can sell the package onwards, applying his or her own policy. The final buyer then walks down the tree of applicable policies to unpack data as far as he or she can. In the end, there is an opportunity in general for multiple parties to make money or exchange other value, while not allowing any one party to run off with the whole dataset (unless allowed by policy).

For purposes of illustration, and not limitation, an example of a simple implementation of a package with three different accuracy levels will now be described in further detail. In this example, the packager 210 is presented with an input value 208 accurate to within three decimals (for example, 1.234, which in this example shall be referred to as the "high accuracy value"). This value is encrypted with the public key (for example, using PKI technology) of a group known as the "high accuracy group."

The packager 210 also creates a less accurate value (1.1+/−0.2 which in this example shall be referred to as the "medium accuracy value"). This value is encrypted with a public key from a group known as the "medium accuracy group".

The packager 210 also creates a low accuracy value (2+/−1 which in this example shall be referred to as the "low accuracy value"). This value is encrypted with a public key from a group known as the "low accuracy group".

The encrypted values are concatenated and signed with the private key of the sender. In this simple example, the three values along with the signature is considered the package 216.

Receivers of this package, using an unpackager such as unpackager 218, can now verify that the package came from the sender, and extract a value using the private key from the group to which they belong.

For the sake of further illustrating certain embodiments, another example will be described, in which a mathematical function is used to determine the accuracy of a value depending on the identity of the receiver. In this example the packager is presented with an input value 208 accurate within three decimals (for example, 1.234). In this example the receiver has a private and a public number (similar to PKI technology). Applying a first mathematical function to the combination of the input value and the public number and the sender's packaging policies 220 will produce an encoding of the input value.

Applying a second mathematical function to the combination of the private number and the encoding of the input number will produce a value that is close in median and deviation to the sender's input number, as close as the policies allow.

Applying the second mathematical function to the combination of the private number of a third party and the encoding of the sender's input number will produce a value that is further from the median and with lower accuracy.

Further details of illustrative embodiments for accuracy reduction and control will now be provided. According to some embodiments, accuracy can simply be reduced according to the applicable policies by truncation and/or rounding of the input values to generate less accurate output values. This type of simple reduction in accuracy has advantages in certain applications, for example being very simple, fast, and using extremely small amounts of processing power. For some applications, however, such simple reductions may not be suitable. For example, in some situations, increased accuracy can be determined by the recipient of truncated data by looking at the exact time when the truncated value changes. An example of such an 'edge effect' in the context of geo location data is when a recipient notices the location data change, the recipient can infer a more precise location at that particular time.

Figure 3A:
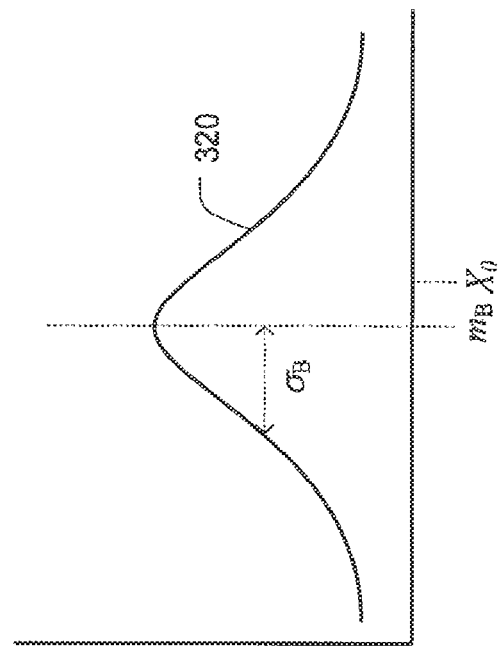
FIGS. 3A and 3B are plots showing normal distribution for data before and after accuracy reduction, according to some embodiments.
Figure 3B:
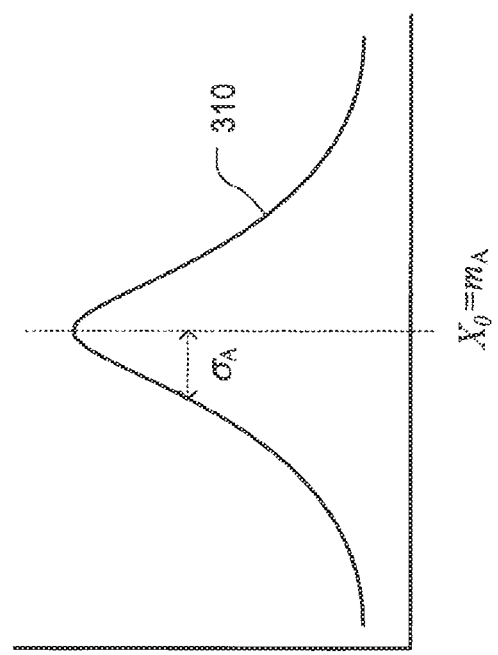

According to other embodiments, other algorithms are used to reduce the accuracy of data that avoid such problems with truncation. FIGS. 3A and 3B are plots showing a normal distribution for data before and after accuracy reduction, according to some embodiments. In FIG. 3A, input values curve 310 has a normal distribution with a mean $m_A$ at a point $X_0$, and a standard deviation $\sigma_A$. In FIG. 3B, output values curve 320 has a normal distribution and, due to accuracy reduction, has a shifted mean $m_B$ which is offset from the point $X_0$ of the input values curve 310. Curve 320 also has an altered standard deviation $\sigma_B$. The transform used may, for example, depend on the policies. For example, the policies may be used to determine the amount of alteration of the mean and deviation of curve 320. For example, in the context of the systems shown in FIG. 2, the amount of alteration of the mean and/or deviation of the one or more values 208 to yield the output values 224 can be controlled by the one or more policy sets A and/or B, and the identity sets A and/or B. According to some embodiments a randomizing function is used to transform where the probability of the output is a Gaussian distribution of a certain mean and standard deviation. In the context of geo location data, for example, the mean of the output can be interpreted as the actual position of the user of the device, and the standard deviation of the output may be interpreted as the accuracy of the geo location data.

It will be appreciated that embodiments of the systems and methods described herein can readily be applied in any suitable context, for example, without limitation, embodiments of the systems and methods described here can be used to control the accuracy of medical statistics, the accuracy of location and other data in augmented reality applications, financial estimates of risk and worth in financial applications, and/or the like.

An example of an illustrative implementation of a system and method for controlling accuracy based on policies will now be described in greater detail in the context of a user controlling geo location resolution. The described system allows users to control the quality and resolution of the geo location data transmitted from a geo location aware device. The described systems give the user the ability to decide who gets what quality of geo location data. In one example, a user of a geo location transmitting device wants to give the highest accuracy geo location data to nearby restaurants in order to take advantage of special offers, while an acquaintance of the user only gets geo location data with an accuracy of about 100 miles.

Figure 4:
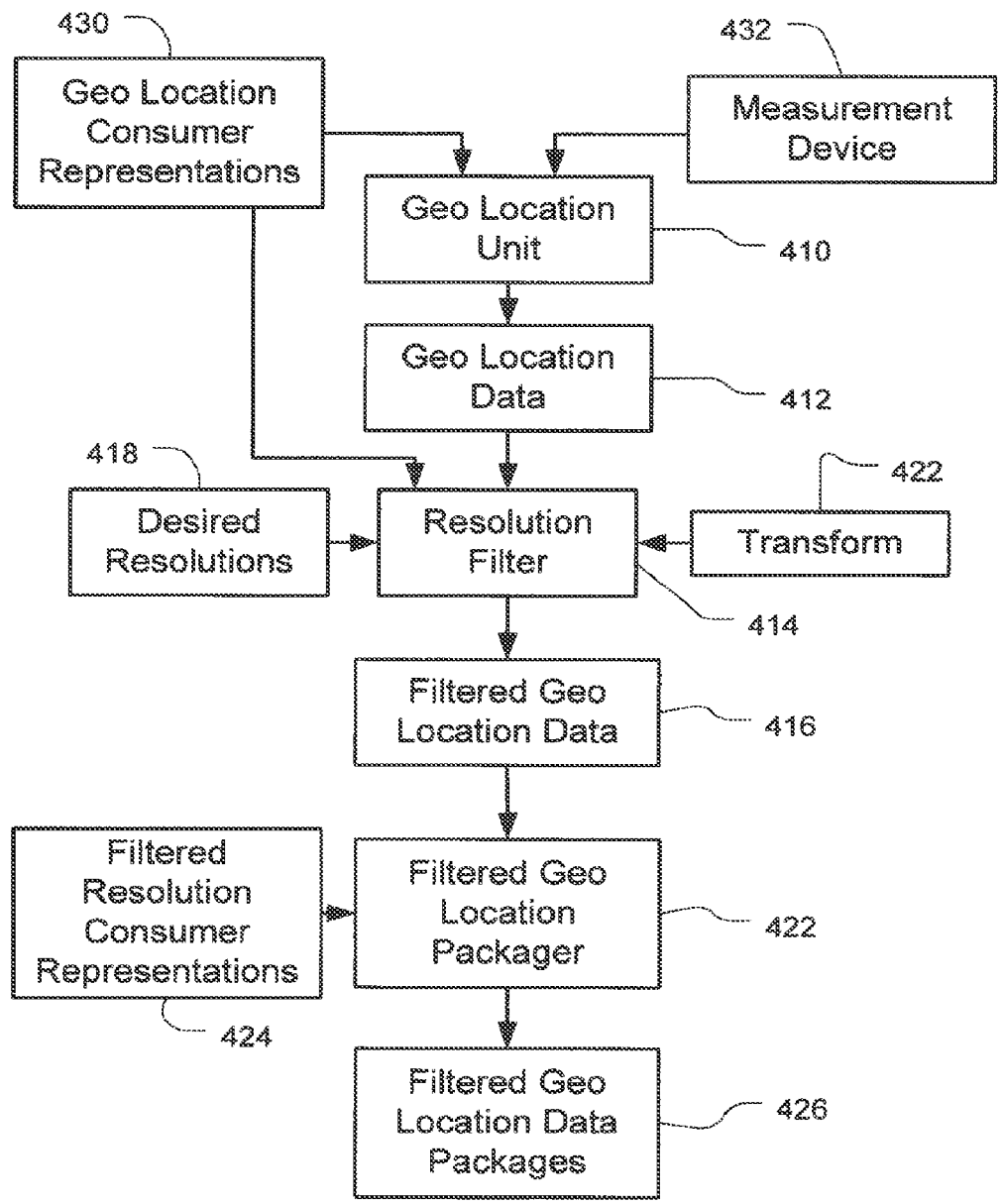
FIG. 4 shows various components of a system for user controllability of quality and resolution of geo location data transmitted from a geo location aware device, according to some embodiments.

FIG. 4 shows various components of a system for user controllability of quality and resolution of geo location data transmitted from a geo location aware device, according to some embodiments. The system includes a geo location unit 410, which provides a measurement of the coordinates for geo location. According to some embodiments, this may be a physical unit providing actual coordinates in the earth coordinate system. According to other embodiments, this may be an input module for a speculative coordinate that the user decides to be the earth position he or she ought to be. The output of the geo location unit 410 is called geo location measurement data 412. According to some embodiments, the geo location measurement 412 also potentially includes a time when the measurement was made. According to some embodiments, the geo location data 412 is expressed in a specific coordinate system such as latitude and longitude, using the WGS 84 geodetic datum or a local system specific to a country. According to other embodiments, the geo location data 412 is expressed in one or more other ways, such as country, region, city, postal/zip code, latitude, longitude, Universal Transverse Mercator coordinates, and/or timezone.

Resolution filter 414 provides the transformation of the geo location measurement data 412 from the geo location unit 410 into filtered resolution geo location data 416. In some embodiments, the transformation is a mathematical function that takes as input a set of desired resolutions 418, a transform 422, and geo location measurement data 412. The output of this module is a set of filtered resolution geo location data 416.

Filtered geo location packager 422 takes as input the filtered resolution geo location data 416 and, optionally, a set of geo location consumer representations or policies 424. The module produces a set of filtered resolution geo location data packages 426 that will be presented to the users and consolidators of the geo location data.

Further illustrative details with respect to some embodiments of the components shown in FIG. 4 will now be provided. The geo location unit 410 provides the rest of the system with geographic location data. According to some embodiments, the data is an actual measurement of the GPS coordinates of the physical device. The measurement is provided by one of the standard physical devices 432 for such measurements. According to some other embodiments, the location data is provided as a speculative location by the user of the device, or as input from an automaton that varies the speculative geographic position. Thus, in some embodiments, one of the inputs to this unit is the geo location consumer representations 430.

According to one example, the user wants to give actual geo location data directly from the physical GPS unit to restaurants.

According to another example, the user may want to get a rough idea of what things would look like if he was in a different town, and provides pinpoint accurate Geo Location Data. In this example, the user may want to create an automaton that virtually wanders down a specific street collecting interesting information as it progresses.

According to another example, the user may want it to appear to one person as if he is stuck in traffic and can't get to a meeting at 10:30 with the head of marketing, while at the same time appearing to another person as if he is headed for the flower shop to buy some roses.

According to another example, the user may want to vary or alter the time stamp of a path down a particular street to see if there are any benefits to going there during the evening.

The resolution filter 414 provides a level of accuracy of geo location measurement that is appropriate for each consumer of the geo location data. This module takes as input a set of geo location consumer representations 430. From the representation the unit derives what transformation 422 to apply to the geo location data. The unit may also use a default transformation. The unit may also rely on user input to determine the transformation.

According to some embodiments, as described with respect to FIG. 3, the geo location data may be taken as input to a randomizing function with the probability of the output being a Gaussian distribution of a certain mean and standard deviation. The mean may be interpreted as the actual physical position of the user of the device. The standard deviation may be interpreted as the accuracy of the geo location data.

According to other embodiments, the geo location data may be taken as input to a rounding or truncating function that rounds of truncates the geo location data to within a rectangle of geographic location. The sides of the rectangle may be interpreted as the accuracy of the location. It should be noted that a high accuracy measurement of the user's position can be obtained during a transition across rectangle boundaries. This may be an unwanted effect for the user.

According to some embodiments, the transformation may give different measurement accuracy depending on the data in the geo location consumer representations 430. For example, a policy set by a judge may control the transformation of geo location data down to a specific accuracy as part of a house arrest.

The filtered geo location packager 422 packages filtered resolution geo location data 416 in a way appropriate for each consumer of the geo location data. This module 422 takes as input a set of filtered resolution geo location data 416 and a set of geo location consumer representations 424. From this a set of geo location packages 426 are produced.

According to one example, the filtered resolution geo location data is encrypted with the public key of a trusted consolidator or friend, thus providing the consumer (e.g., a trusted consolidator or friend) with a highly accurate real-time physical measurement of the user's geographic position. According to another example, the filtered resolution geo location data may be sent without encryption to a public web site where certain types of offenders can be tracked by the public during their probation.

According to one example, the packaged geolocation can be published on a public (or private) website where the general public can view the geolocation with some accuracy while specific friends or authorized entities can view the geolocation with higher accuracy.

Further details of illustrative data structures involved in a system for controlling accuracy of geo location data will now be provided. In one embodiment, there are three main classes of data: geo location data 412; geo location consumer representations 430; and geo location packages 426.

The Geo Location Data (412). This data encodes a position and optionally a time for the measurement. Time for the measurement may be absent, or inferred by the apparatus. The geo resolution filter 414 acts on this data. Physical coordinates, as well as time, may be manipulated by the geo resolution filter 414.

Geo Location Consumer Representations (430). This data encodes the particulars about the consumers of the geo location data for the device. This data may include the accuracy a particular consumer is limited to. This may include the frequency of updates the consumer is entitled to. This may include a time when the consumer is entitled to the geo location data. This may include limitations to the coordinates the consumer is entitled to. This may include an address to the consumer. This may include a public key of the consumer. This may include a device that calculates some or all of the value of the constituent parts of data in the geo location of the geo location consumer representation 430.

Geo Location Packages (426). In one embodiment, this data is the end product of the apparatus, and can be transmitted to the consumer of the geo location data.

According to the example of geo location data accuracy, there are two types of "users" of the system. The first type of user is the user of the geo location unit 410. This is the entity or individual that provides the geo location data by physically placing the geo location unit at some location in the terrain, or otherwise provides input to the geo location unit 410. The second type of user is the geo location data consumer. This is the entity or individual that consumes the geo location data. According to some embodiments, this may be a third party that has obtained the rights to this data by some negotiation, or this may be the user of the apparatus itself, who by some negotiation has obtained the rights to view the results of some computation of the geo location data.

Figure 5:
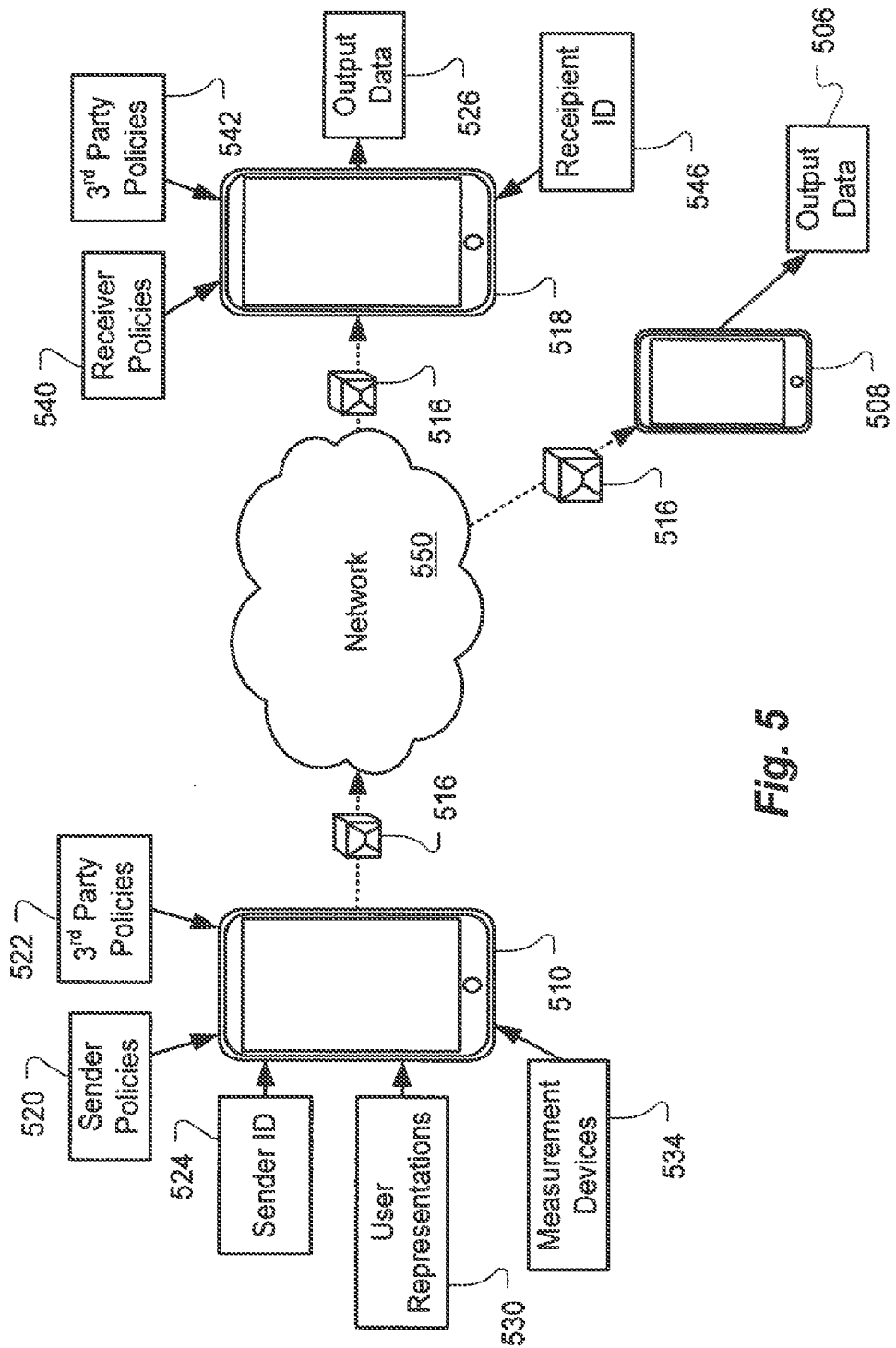
FIG. 5 is a diagram showing further detail of a system or method for controlling accuracy using policies, according to some embodiments.

FIG. 5 is a diagram showing further detail of a system or method for controlling accuracy using policies, according to some embodiments. In FIG. 5, sender's device 510 generates a package 516 based on data from one or more measurement devices 534 and/or user representations 530. According to some embodiments, one or more of the measurement devices 534 are integrated into the sender's device 510. Device 510 can be a mobile device such as a laptop computer, netbook computer, or a tablet computer that communicates wirelessly with a network. According to some embodiments, device 510 is a smart phone. According to some embodiments, device 510 is an augmented reality browser device such as described in co-pending U.S. patent application Ser. No. 12/180,208 (Publication No. 2009/0029718 A1), filed Jul. 25, 2008 ("the '208 application") entitled "Content Publishing System and Methods" which is incorporated herein by reference. According to some embodiments, device 510 is an non-mobile computer or computer system. Device 510 preferably has a keyboard, touch sensitive panel, and/or other human input capability to receive input from the sender. Device 510 also preferably has a display, speakers and/or audio output so as to allow information to be displayed or otherwise communicated to the sender. Device 510 also receives an identification set 524 of the sender, policies from the sender 520 and/or policies from third parties 522. In the example shown in FIG. 5, the device 510 sends a package 516 via a network 550 to one or more recipients. The network 550 can be, for example, the internet, a phone network or some other communications network.

Package 516 is received by receiver's device 518 from network 550. According to some embodiments, the receiver's device is similar or identical to the sender's device. As in the case with device 510, device 518 can be a mobile device such as a laptop computer, netbook computer, or a tablet computer that communicates wirelessly with a network. Device 518 could also be a smart phone, or an augmented reality browser device such as described in the '208 application. According to some embodiments, device 518 is an non-mobile computer or computer system. Device 518 preferably has a keyboard, touch sensitive panel, and/or other human input capability to receive input from the sender. Device 518 also preferably has a display, speakers and/or audio output so as to allow information to be displayed or otherwise communicated to the sender. Device 518 receives receiver policies 540, third party policies 542 and/or recipient ID information 546. The receiver policies and the receiver identification information can be entered by the recipient directly, can be saved locally on the device 518, or may be downloaded from a network such as network 550. Similarly, the third party policies can be stored locally on the device 518 or can be downloaded from a network such as network 550. In one embodiment, device 518 includes a digital rights management engine (e.g., as described in the '693 application) for enforcing policies associated with data packages. Based on the available policy and identification information, device 518 unpacks package 516 and generates output data 526, as has been described elsewhere herein. Depending on the application, the output data 526 can be used directly by the recipient, for example by displaying the data to the recipient, or may be used by one or more other devices. For example, according to some embodiments, the output data 526 is used directly by modules within device 518.

According to some embodiments, an identical or substantially similar package can be sent to more than one recipient device. In the example shown in FIG. 5, package 516 is shown also be sent from the network 550 to another recipient device 508. Although the same package 516 is received, the device 508, which may be similar or identical in configuration to device 518, in general will yield different output data 506. This is because applicable policies and identification information may be different for device 508.

Figure 6:
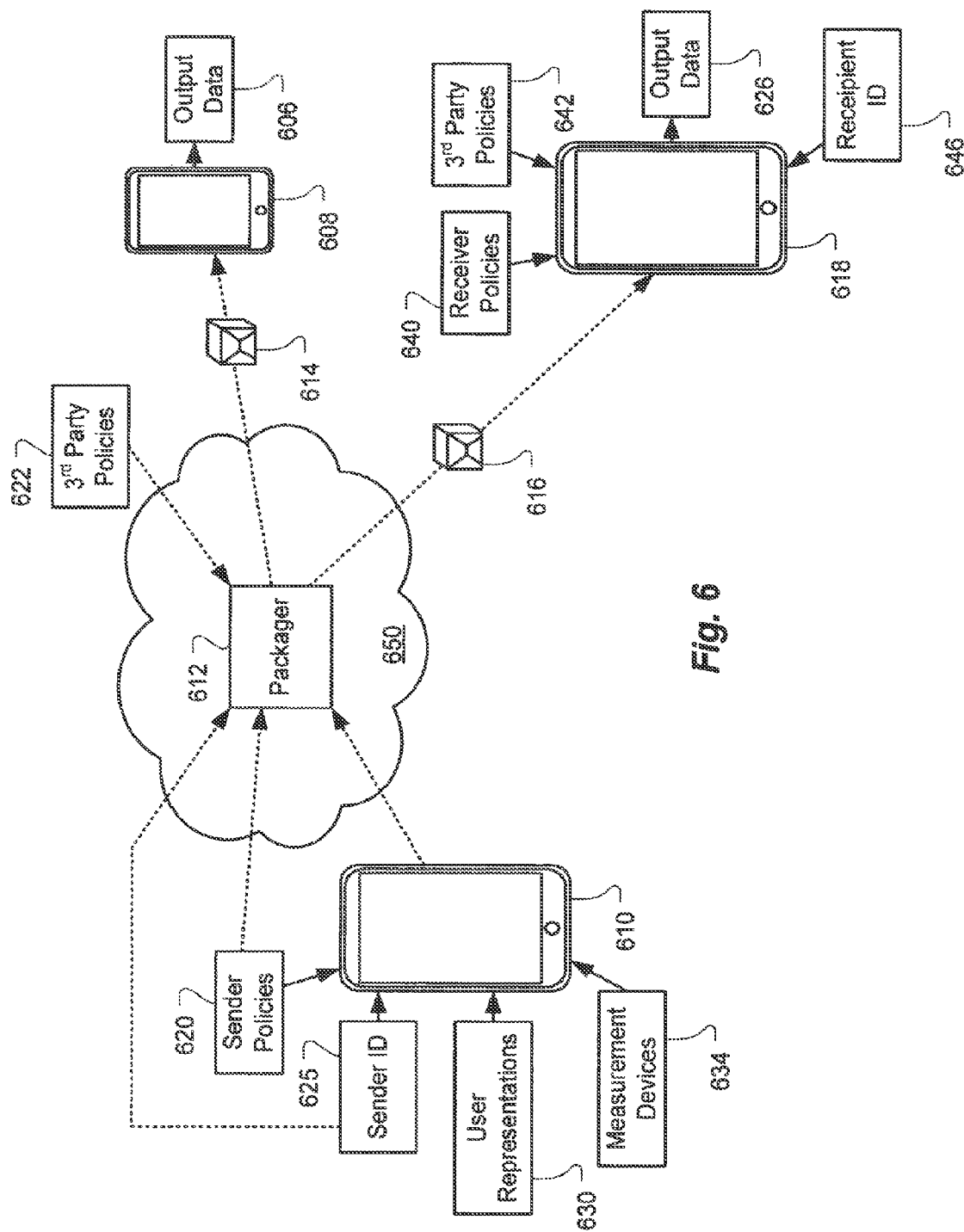
FIG. 6 is a diagram showing further detail of a system or method for controlling accuracy using policies, according to some other embodiments.

FIG. 6 is a diagram showing further detail of a system or method for controlling accuracy using policies, according to some other embodiments. In FIG. 6, device 610 gathers information from one or more measurement devices 634 and/or user representations 630. According to some embodiments, one or more of measurement devices 634 can be integrated with device 610. Sender's device 610 can be a mobile device such as a laptop computer, netbook computer, or a tablet computer that communicates wirelessly with a network. According to some embodiments, device 610 is a smart phone. According to some embodiments, device 610 is an augmented reality browser device such as described in the '208 application. According to some embodiments, device 610 is an non-mobile computer or computer system. Device 610 preferably has a keyboard, touch sensitive panel, and/or other human input capability to receive input from the sender. Device 610 also preferably has a display, speakers and/or audio output so as to allow information to be displayed or otherwise communicated to the sender. Device 610 receives an identification set 624 of the sender, policies from the sender 620 and/or policies from third parties 622. The device 610 sends the input data to the network 650. The data is from one or more measurement devices 634 and/or from user representations 630. The network 650 can be, for example, the internet, a phone network or some other communications network.

Also connected to network 650 is a packager 612 that receives the measurement and/or user representation data from device 610. The device 610 also sends to the packager 612 via network 650 applicable sender identification information 625 and/or sender policies 620. According to some embodiments, packager 612 also receivers third policy policies 622 from third parties. According to some embodiments, the sender's policies, and information relating to the sender's identification can also be retrieved by packager 612 from sources separate from device 610. For example, the sender's policies may be located on a separate server that is accessible via the network 650. Packager 612 generates packages such as 614 and 616 based on data from one or more measurement devices 634 as well as the applicable policies 620 and 622, and/or user representations 630.

Package 616 is received by receiver's device 618 from network 650. According to some embodiments, the receiver's device is similar or identical to the sender's device. Device 618 receives receiver policies 640, third party policies 642 and/or recipient ID information 646. The receiver policies and the receiver identification information can be entered by the recipient directly, can be saved locally on the device 618, or may be downloaded from a network such as network 650. Similarly, the third party policies can be stored locally on the device 618 or can be downloaded from a network such as network 650. Based on the available policy and identification information, device 618 unpacks package 616 and generates output data 626, as has been described elsewhere herein.

According to some embodiments, another package 614 is generated by packager 612 using the same or similar information as was used to generate package 616. Package 614 may be different than 616, however, due to information regarding the recipient identity associated with device 608, for example.

Figure 7:
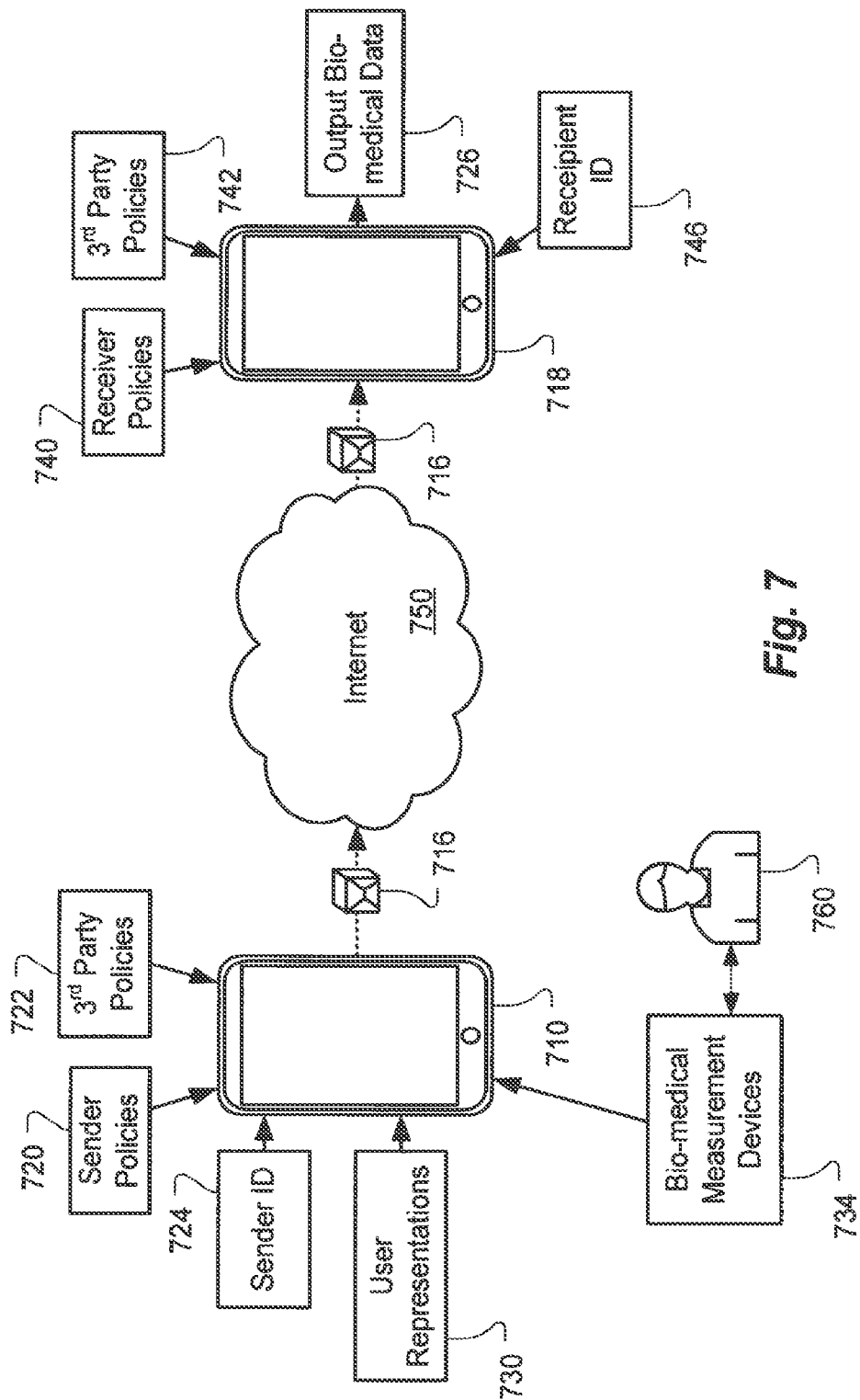
FIG. 7 is a diagram showing further detail of a system or method for controlling accuracy of bio-medical related data using policies, according to some embodiments.

FIG. 7 is a diagram showing further detail of a system or method for controlling accuracy of bio-medical related data using policies, according to some embodiments. In FIG. 7, sender's device 710 generates a package 716 based on data from one or more bio-medical measurement devices 734 and/or user representations 730. According to some embodiments, one or more of the measurement devices 734 are integrated into the sender's device 710. According to some embodiments, data from one or more of the measurement devices 734 are transmitted to device 710, and/or entered into device 710 manually by the sender or another user. Examples of bio-medical measurement devices include, without limitation, devices that measure physiological data such as body temperature, blood pressure, pulse rate, respiratory rate, blood glucose or other types of blood chemistry measurements, and/or the like.

Device 710 can be a mobile device such as a laptop computer, netbook computer, or a tablet computer that communicates wirelessly with a network. According to some embodiments, device 710 is a smart phone. According to some embodiments, device 710 is an augmented reality browser device such as described in the '208 application. According to some embodiments, device 710 is an non-mobile computer or computer system. Device 710 preferably has a keyboard, touch sensitive panel, and/or other human input capability to receive input from the sender. Device 710 also preferably has a display, speakers and/or audio output so as to allow information to be displayed or otherwise communicated to the sender. Device 710 also receives an identification set 724 of the sender, policies from the sender 720 and/or policies from third parties 722. In the example shown in FIG. 7, the device 710 sends a package 716 via a network 750 to one or more recipients. The network 750 can be, for example, the internet, a phone network or some other communications network.

Package 716 is received by receiver's device 718 from network 750. According to some embodiments, the receiver's device is similar or identical to the sender's device. As in the case with device 710, device 718 can be a mobile device such as a laptop computer, netbook computer, or a tablet computer that communicates wirelessly with a network. Device 718 could also be a smart phone, or an augmented reality browser device such as described in the '208 application. According to some embodiments, device 718 is an non-mobile computer or computer system. Device 718 preferably has a keyboard, touch sensitive panel, and/or other human input capability to receive input from the sender. Device 718 also preferably has a display, speakers and/or audio output so as to allow information to be displayed or otherwise communicated to the sender. Device 718 receives receiver policies 740, third party policies 742 and/or recipient ID information 746. The receiver policies and the receiver identification information can be entered by the recipient directly, can be saved locally on the device 718, or may be downloaded from a network such as network 750. Similarly, the third party policies can be stored locally on the device 718 or can be downloaded from a network such as network 750. Based on the available policy and identification information, device 718 unpacks package 716 and generates output data 726, as has been described elsewhere herein. Depending on the application, the output data 726 can be used directly by the recipient, for example by displaying the data to the recipient, or may be used by one or more other devices. For example, according to some embodiments, the output data 726 is used directly by modules within device 718.

According to some embodiments, an identical or substantially similar package can be sent to more than one recipient device. In the example shown in FIG. 7, package 716 is shown also be sent from the network 750 to another recipient device 708. Although the same package 716 is received, the device 708, which may be similar or identical in configuration to device 718, in general will yield different output data 706. This is because applicable policies and identification information may be different for device 708.

According to some embodiments the systems and methods described herein are used for controlling the accuracy of financial information based on one or more policies. For example, the accuracy of financial estimates of risk and worth in financial applications can be controlled using policies according to the systems and methods described herein. According to another example, the numerical value is a price for a class of similar objects. According to another example, the systems and methods described herein are used to control accuracy of a prediction. In this example, an investor may want to know the accuracy of prediction assigned to a consultant. This value can be presented with variable accuracy depending on the identity of the individual requesting the prediction.

According to other embodiments, the techniques described herein are applied to combinations of geo-location, financial and/or medical information. According to one example, a "real estate" centric map is created where the financial information, such as tax returns, of residents (or homeowners) are aggregated and presented with a four block accuracy for the purpose of presenting a map of how wealth is distributed in a city.

According to another example, the location of cancers is aggregated and presented with a four block accuracy for the purpose of presenting a map of how toxic materials are distributed in a city.

According to another example, the location of traffic accidents are aggregated and presented with a four block accuracy.

According to some embodiments, the values in the above examples are overlaid and presented in an augmented reality map for the purpose of showing prospective buyers the risks and benefits of a neighborhood.

According to one example, a low accuracy estimate of wealth is released to car dealerships while negotiating the sale price of a new car.

According to another example, a vendor is selling goods and/or services. The vendor releases an estimate of the price of a product while the purchaser releases an estimate of how much he is willing to pay. A third party aggregator compares the values and when a reasonable match is found, puts the buyer and seller in contact with each other.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A method comprising:
    receiving, at a device, location data associated with a location, the location data obtained from a geolocation circuitry at the device;
    transforming, at the device, the received location data into resolution-filtered location data, wherein the resolution-filtered location data comprises the location expressed in a plurality of accuracies;
    packaging, at the device, the resolution-filtered location data expressed in the plurality of accuracies with a first policy defining one or more rules associated with a use of the resolution-filtered location data expressed in the plurality of accuracies, wherein the packaging generates packaged resolution-filtered location data, wherein applying the first policy at a first recipient of the packaged resolution-filtered location data provides the location expressed in a first accuracy, wherein applying the first policy at a second recipient of the packaged resolution-filtered location data provides the location expressed in a second accuracy, and wherein the first accuracy and the second accuracy are encrypted with different public keys; and
    transmitting, at the device, the packaged resolution-filtered location data including the first policy to a system associated with a consumer.

2. The method of claim 1, wherein the location data comprises latitude and longitude information associated with the location.

3. The method of claim 1, wherein the location data comprises a user-specified location.

4. The method of claim 1, wherein the location data compresses a physical address.

5. The method of claim 1, wherein the location data comprises at least one time indication associated with a generation of the location data by the geo-location unit.

6. The method of claim 1, wherein transforming the location data comprises randomizing the location data to generate the resolution-filtered location data.

7. The method of claim 1, wherein transforming the location data comprises transforming the location data according to one or more second policies.

8. The method of claim 7, wherein the one or more second policies articulate a distribution for the resolution-filtered location data.

9. The method of claim 7, wherein at least one of the one or more second policies is associated with the consumer.

10. The method of claim 7, wherein at least one of the one or more second policies is associated with a user of the device.

11. The method of claim 1, wherein the device comprises a processor, a computer, a smartphone, a mobile device, and/or a mobile wireless device.

12. The method of claim 11, wherein the device includes a packaging module.

13. A non-transitory computer-readable medium storing instructions that, when executed by a processor, cause the processor to perform a method comprising:
   receiving, at a device, location data associated with a location, the location data obtained from a geolocation circuitry at the device;
   transforming, at the device, the received location data into resolution-filtered location data, wherein the resolution-filtered location data comprises the location expressed in a plurality of accuracies;
   packaging, at the device, the resolution-filtered location data expressed in the plurality of accuracies with a first policy defining one or more rules associated with a use of the resolution-filtered location data expressed in the plurality of accuracies, wherein the packaging generates packaged resolution-filtered location data, wherein applying the first policy at a first recipient of the packaged resolution-filtered location data provides the location expressed in a first accuracy, wherein applying the first policy at a second recipient of the packaged resolution-filtered location data provides the location expressed in a second accuracy, and wherein the first accuracy and the second accuracy are encrypted with different public keys; and
   transmitting, at the device, the packaged resolution-filtered location data including the first policy to a system associated with a consumer.

14. The non-transitory computer-readable medium of claim 13, wherein the location data comprises latitude and longitude information associated with the location.

15. The non-transitory computer-readable medium of claim 13, wherein the location data comprises a user-specified location.

16. The non-transitory computer-readable medium of claim 13, wherein the location data compresses a physical address.

17. The non-transitory computer-readable medium of claim 13, wherein the location data comprises at least one time indication associated with a generation of the location data by the geo-location unit.

18. The non-transitory computer-readable medium of claim 13, wherein transforming the measurement data comprises randomizing the measurement data to generate the resolution-filtered location data.

19. The non-transitory computer-readable medium of claim 13, wherein transforming the measurement data comprises transforming the measurement data according to one or more second policies.

20. The non-transitory computer-readable medium of claim 19, wherein the one or more second policies articulate a distribution for the resolution-filtered location data.

21. The non-transitory computer-readable medium of claim 19, wherein at least one of the one or more second policies is associated with the consumer.

22. The non-transitory computer-readable medium of claim 19, wherein at least one of the one or more second policies is associated with a user of the device.

23. An apparatus, comprising:
   at least one processor; and
   at least one memory including computer program code, the at least one memory and the computer program code configured to, with the at least one processor, cause the apparatus to perform at least the following:
      receive location data associated with a location, the location data obtained from a geolocation circuitry at the device;
      transform the received location data into resolution-filtered location data, wherein the resolution-filtered location data comprises the location expressed in a plurality of accuracies;
      package the resolution-filtered location data expressed in the plurality of accuracies with a first policy defining one or more rules associated with a use of the resolution-filtered location data expressed in the plurality of accuracies, wherein the packaging generates packaged resolution-filtered location data, wherein applying the first policy at a first recipient of the packaged resolution-filtered location data provides the location expressed in a first accuracy, wherein applying the first policy at a second recipient of the packaged resolution-filtered location data provides the location expressed in a second accuracy, and wherein the first accuracy and the second accuracy are encrypted with different public keys; and
      transmit the packaged resolution-filtered location data including the first policy to a system associated with a consumer.

* * * * *